US012756914B2

(12) United States Patent
Plummer et al.

(10) Patent No.: US 12,756,914 B2
(45) Date of Patent: Oct. 6, 2026

(54) DARTBOARD CAMERA UNIT

(71) Applicant: Gravity Brands Limited, Harlow (GB)

(72) Inventors: Garry Plummer, Harlow (GB); Reem Haneman, London (GB)

(73) Assignee: Gravity Brands Limited, Harlow (GB)

( * ) Notice: Subject to any disclaimer, the term of this patent is extended or adjusted under 35 U.S.C. 154(b) by 0 days.

(21) Appl. No.: 18/471,736

(22) Filed: Sep. 21, 2023

(65) Prior Publication Data

US 2024/0107146 A1 Mar. 28, 2024

(30) Foreign Application Priority Data

Sep. 23, 2022 (GB) ..................................... 2213900

(51) Int. Cl.

| | |
|---|---|
| ***H04N 5/335*** | (2011.01) |
| ***F41J 3/00*** | (2006.01) |
| ***F41J 5/10*** | (2006.01) |
| ***H04N 23/55*** | (2023.01) |
| ***H04N 23/90*** | (2023.01) |

(52) U.S. Cl.
CPC ............ *H04N 23/55* (2023.01); *F41J 3/0009* (2013.01); *F41J 5/10* (2013.01); *H04N 23/90* (2023.01)

(58) Field of Classification Search
CPC .................................. F41J 3/0009; F41J 5/10
See application file for complete search history.

(56) References Cited

U.S. PATENT DOCUMENTS

| | | | | |
|---|---|---|---|---|
| 4,789,932 A | 12/1988 | Cutler et al. | | |
| 5,842,929 A * | 12/1998 | Moody | A63D 5/04 | 473/70 |
| 6,762,790 B1 * | 7/2004 | Matko | F16M 11/10 | 396/428 |
| 7,985,125 B2 | 7/2011 | Kagami et al. | | |
| 8,113,930 B1 * | 2/2012 | Coats | F41J 3/0019 | 273/348 |

(Continued)

FOREIGN PATENT DOCUMENTS

| | | |
|---|---|---|
| CN | 106940155 A | 7/2017 |
| CN | 112911178 A | 6/2021 |

(Continued)

OTHER PUBLICATIONS www.ergomart.com/height-adjustable-sliding-monitor-arm-for-roller-track; "Roller Track Monitor Arm On A Sliding Movable Wall Mount"; Mar. 10, 2021; pp. 1-16 (Year: 2021).*

(Continued)

*Primary Examiner* — Gary C Vieaux
(74) *Attorney, Agent, or Firm* — Withrow + Terranova, PLLC; Vincent K. Gustafson

(57) ABSTRACT

A camera unit is configured to be mounted adjacent a dartboard. The camera unit comprises a primary camera and a secondary camera supported by a support frame. The primary camera captures a darts player using the dartboard and the secondary camera captures a play surface of the dartboard. The camera unit further comprises a wireless interface module arranged to wirelessly transmit image data captured by the cameras, and/or derived data, such as a determination that a dart has been thrown, a determination that a foul throw has occurred, or a score associated with a dart that has struck the dartboard.

19 Claims, 6 Drawing Sheets

(56) References Cited

U.S. PATENT DOCUMENTS

| | | | | |
|---|---|---|---|---|
| 10,126,102 | B2 | 11/2018 | Teng et al. | |
| 10,337,667 | B2 * | 7/2019 | Matthews | F16M 11/08 |
| 10,659,702 | B2 * | 5/2020 | Yasutake | H04N 23/51 |
| 10,901,303 | B2 * | 1/2021 | Egor | G03B 17/561 |
| 2006/0273661 | A1 * | 12/2006 | Toebes | H04L 12/10 307/106 |
| 2011/0031696 | A1 * | 2/2011 | Su | F41J 5/02 273/371 |
| 2012/0083342 | A1 * | 4/2012 | Cross | F41J 3/0009 273/371 |
| 2016/0037139 | A1 * | 2/2016 | Bacus | H04N 5/77 348/157 |
| 2016/0054103 | A1 | 2/2016 | Macher | |
| 2016/0370155 | A1 * | 12/2016 | Dale | H04N 23/90 |
| 2017/0167832 | A1 * | 6/2017 | Hong | F41J 5/00 |
| 2017/0191805 | A1 | 7/2017 | Teng et al. | |
| 2017/0307341 | A1 | 10/2017 | Hollinger et al. | |
| 2020/0018576 | A1 | 1/2020 | Hollinger et al. | |
| 2020/0116176 | A1 * | 4/2020 | Dunn | F16M 11/14 |
| 2022/0228843 | A1 * | 7/2022 | Dale | F41J 5/14 |
| 2022/0342284 | A1 * | 10/2022 | Peterson | F16M 11/18 |
| 2022/0373304 | A1 * | 11/2022 | Teng | F41J 3/02 |

FOREIGN PATENT DOCUMENTS

| | | | |
|---|---|---|---|
| DE | 102009049998 | A1 | 5/2010 |
| DE | 102017113575 | A1 | 12/2018 |
| EP | 3156754 | A1 | 2/2018 |
| EP | 2919183 | B1 | 3/2018 |
| EP | 3348952 | A1 | 3/2019 |
| GB | 2317225 | A | 3/1998 |
| GB | 2584301 | A | 12/2020 |
| KR | 20070062658 | A | 6/2007 |
| TW | 201712294 | A | 4/2017 |
| TW | I612990 | B | 2/2018 |
| WO | 9831979 | A1 | 7/1998 |
| WO | 2016203194 | A1 | 12/2016 |

OTHER PUBLICATIONS https://www.ergomart.com/height-adjustable-sliding-monitor-arm-for-roller-track; "Roller Track Monitor Arm On A Sliding/Movable Wall Mount", Mar. 10, 2021; pp. 1-16 (Year: 2021).*

Target Sports, Ltd.; https://www.target-darts.co.uk/virt-camera ; Jul. 16, 2024, (Year: 2024).*

Gran Darts, "Gran Cam Setup Guide," Version 1.0, May 2015, available from the Internet: [URL: https://gran-darts.com/de/pages/gran-cam-manual], 2 pages.

Search Report for Netherlands Patent Application No. 2035867 mailed Apr. 19, 2024 (3 pages, plus English translation).

Written Opinion for Netherlands Patent Application No. 2035867 mailed Apr. 19, 2024 (5 pages, plus English translation).

* cited by examiner

DARTBOARD CAMERA UNIT

CROSS-REFERENCE TO RELATED APPLICATIONS

This application claims priority to United Kingdom Patent Application No. 2213900.0 filed on Sep. 23, 2022, wherein the entire contents of the foregoing application are hereby incorporated by reference herein.

TECHNICAL FIELD

The present invention relates to a camera unit configured to be mounted proximate a dartboard.

BACKGROUND

Darts is a competitive sport in which two or more players throw small, sharp-tipped missiles, known as darts, at a round target known as a dartboard. Points are scored by hitting specific marked areas of the board, which are distributed across the board and do not follow a principle of points increasing towards the centre of the board.

Though a number of similar games using various boards and rules exist, the term "darts" usually now refers to a standardised game involving a specific board design and set of rules.

According to the World Darts Federation, a regulation dartboard is 451 mm (±3 mm) in diameter and is divided into 20 radial sections around a bull's eye at the centre. Each section is separated with metal wire or a thin band of sheet metal. Regulation dartboards are made from sisal fibres, although cheaper, non-regulation dartboards may alternatively use cork, coiled paper or other materials.

For competitive play, a dartboard should be hung so that the centre of the bull's eye is 1.73 m from the floor. A raised oche (line behind which the thrower must stand) should be placed on the floor such that the back of the oche is 2.37 m from the face of the dartboard.

A game of darts is generally contested between two players, who take turns throwing three darts per turn. The throwing player must stand so that no portion of their feet extends past the leading edge of the oche, but may lean forward over it if desired. The most common objective is to reduce a fixed score, commonly 301 or 501, to zero.

Traditionally, darts has been played between two players at the same physical location and using a single dartboard. However, a desire exists for players to play darts together using separate dartboards in remote locations.

At least the preferred embodiments of the present invention seek to facilitate remote play of darts.

SUMMARY

Viewed from a first aspect, the present invention provides a camera unit configured to be mounted adjacent a dartboard, the camera unit comprising: a primary camera and a secondary camera; a support frame arranged to support the primary and secondary camera relative to one another such that, when the camera unit is mounted adjacent the dartboard, the primary camera will capture a darts player using the dartboard and the secondary camera will capture a play surface of the dartboard; and a wireless interface module arranged to wirelessly transmit image data captured by the primary camera and the secondary camera, and/or data derived from the image data captured by the primary camera and the secondary camera, wherein the camera unit is mountable adjacent the dartboard such that: the primary camera, the secondary camera and the support frame do not obstruct the play surface of the dartboard in a direction perpendicular to a plane of the play surface of the dartboard; a line extending between a bullseye of the play surface and the secondary camera is at an angle greater than 30° with respect to the plane of the play surface of the dartboard; the primary camera captures a throw line region including at least 1 meter in width at floor level, the throw line region being located horizontally 2.37 meters away from the dartboard, and the view of the primary camera of the throw line region is not obstructed by the secondary camera or the support frame.

The bull's eye of the dartboard may be located at substantially a centre of the dartboard. The dartboard may comprise twenty radial sections, which may be arranged rotationally symmetrically around the bull's eye.

The play surface of the dartboard may have a diameter of between 330 mm and 350 mm, and preferably about 340 mm.

The dartboard may have a diameter of between 400 mm and 500 mm, and preferably about 451 mm.

The dartboard may be a regulation dartboard in compliance with the rules of the World Darts Federation. For example, the dartboard may be in compliance with the dartboard specifications at section 4 of the WDF Playing And Tournament Rules—rev 20.

The support frame may comprise an arm. The arm may extend in a generally horizontal direction. The arm may extend outwardly from a wall when the camera unit is installed, such that it extends in a direction perpendicular to the plane of the wall.

The camera unit may comprise a camera module. The camera module may comprise the primary camera and the secondary camera. The camera module may be attached to a proximal end of the arm, the proximal end being the end closest to the darts player during play. The camera module may extend downwardly from a lower face of the arm. In this way, it may be ensured that the arm does not obstruct the views of either the primary camera or the secondary camera, for example, when the camera is mounted vertically above the dartboard. The camera module may be attached to the arm through suitable attachment means, or may be integral with the arm.

The camera module may have a proximal side facing the direction of the darts player and a distal side facing the dartboard. The primary camera may be located at the proximal side of the camera unit such that it faces the darts player during play. The secondary camera may be located at the distal side of the camera unit such that it faces the dartboard during play. The secondary camera may lie directly behind the primary camera in the camera module, when viewed from the proximal side. In this way, the secondary camera may not obscure the view of the primary camera, and vice versa.

The primary camera and/or secondary camera may be angled in a downward direction. For example, the primary camera and/or the secondary camera may be angled by up to 45° with respect to a vertical plane, when in use (e.g., when mounted to a vertical wall). In this way, the camera unit can be positioned above the dartboard and the primary camera and secondary camera will still be able to capture the darts player and dartboard, respectively.

Alternatively, the primary camera and the secondary camera may be separate, i.e., not forming part of a single camera module. The primary camera and the secondary camera may therefore be separately attached to the support frame. In this case, the arm may be for supporting the secondary camera only, and the primary camera may be attached to the support frame through other means. The arm may be made from metal, such as aluminium.

The support frame may comprise a rail. The rail may be connected to the arm of the support frame at a distal end of the arm. The distal end of the arm may be opposite the proximal end of the arm and/or may be the end of the arm that is farthest from the dart player during play. The rail may be made from metal, such as aluminium. The rail may be configured to be mounted horizontally and/or vertically. The rail may be configured to be mounted to a wall. For example, the rail may comprise holes or the like for receiving fasteners, such as screws.

The arm may be configured to engage the rail. The arm may be slidably mounted to the rail. Consequently, the camera module may be slidably mounted to the rail through the arm. The rail may comprise a track, and the arm may be configured to engage the track.

In the case where the primary camera and secondary camera are separate, the primary camera may be slidably mounted to the rail and/or may be configured to engage the track. In this way, the camera unit may be configured such that the primary camera moves along the rail independently of the secondary camera.

The support frame may comprise a clip. The clip may be configured to slidably engage the rail, and particularly the track. The clip may be configured to engage the arm, such as by a groove or other fastening feature on the arm. Alternatively, the clip may be formed integrally with the arm. The clip may alternatively be configured to engage the primary camera, and the primary camera may comprise the groove or other fastening feature. The clip may be formed integrally with the primary camera.

The support frame may comprise a bracket. The bracket may be configured to slidably engage the rail, and particularly the track. The bracket may be configured to engage the arm or the primary camera. The arm or the primary camera may be configured to engage the rail via the bracket. The bracket may be configured to engage the distal end of the arm. The bracket may be configured to engage the arm or primary camera by a groove or other fastening feature on the arm or the primary camera. Alternatively, the bracket may be formed integrally with the arm or the primary camera.

The bracket and the clip may be connectable to the primary camera in two configurations. In a first of the configurations, the bracket may be disposed on a first side of the primary camera, and in a second of the configurations, the bracket may be disposed on a second, different side of the primary camera. The first and second sides may be opposite sides of the primary camera.

The support frame may comprise a fastener configured to selectively prevent sliding of the primary camera and/or the secondary camera with respect to the rail. That is to say, the fastener may be configured to lock the primary camera and/or the secondary camera in two or more positions with respect to the rail. The fastener may be configured to engage the bracket. The fastener may be configured to be actuated by hand and/or without tools. For example, the fastener may comprise a thumb screw.

In the case where the primary camera and secondary camera are part of a single camera module, the arm may comprise a fastener configured to selectively prevent sliding of the arm. That is to say, the fastener may be configured to lock the arm in two or more positions with respect to the rail. The fastener may be configured to engage the bracket. The fastener may be configured to be actuated by hand and/or without tools. For example, the fastener may comprise a thumb screw.

The support frame may comprise a secondary camera bracket. The secondary camera bracket may be configured to protect the secondary camera from impact by darts thrown from the throw line region. The secondary camera may be configured to engage the arm via the camera bracket. The secondary camera may be movably mounted within the secondary camera bracket. The secondary camera may be rotatably mounted within the secondary camera bracket.

Alternatively, the secondary camera may be mounted in the camera module such that it is shielded from incoming darts by the housing of the camera module and its positioning behind the primary camera. The secondary camera may be rotatably mounted within the camera module.

The primary camera may be configured to receive power, for example, from a mains power supply. The primary camera may comprise a power port for receiving the power. The secondary camera may be configured to receive power via the primary camera. The primary camera may be in wired communication with the secondary camera, for example, via a USB cable. The primary camera may comprise a secondary camera port for connection to the secondary camera. The secondary camera port may comprise a USB port.

Alternatively, the secondary camera may be configured to receive power, for example, from a mains power supply. In this case, the camera unit may comprise a cable for connecting the secondary camera to a power supply. The cable may be housed within the arm of the camera unit and extend through the arm to the secondary camera. For example, the cable may run through a hollow interior of the arm. The cable may be attached to a power port in the secondary camera. The primary camera may be connected to the cable and may be configured to receive power through the cable. Alternatively, the primary camera may be configured to receive power via the secondary camera, for example, through a wired connection between the primary camera and the secondary camera.

The camera unit may comprise a unit controller, which may be in communication with the wireless interface module. The unit controller may receive the image data captured by the primary camera and the image data captured by the secondary camera.

The primary camera and/or the camera module may comprise the wireless interface module. The primary camera unit and/or the camera module may comprise the unit controller. The camera unit may be configured to transmit data between the primary camera and the secondary camera.

The wireless interface module may be configured for WiFi communication. The wireless interface module may be configured for Bluetooth communication. The wireless interface module may be configured to receive WiFi connection information via Bluetooth communication, for example, from a portable computing device, such as a mobile phone, a tablet computer or a laptop computer.

The camera unit, and particularly the unit controller, may be configured to derive the data derived from the image data. The data may be derived from one or both of the image data received from the primary camera and the image data derived from the secondary camera. The derivation may comprise use of one or both of machine learning and computer vision.

The data derived from the image data may comprise a determination that a dart has been thrown. The data derived from the image data may comprise a determination that a foul throw has occurred, for example, by a player stepping over a throw line. The data derived from the image data may comprise a score associated with a dart that has struck the dartboard.

The throw line region may have a height of at least 1.5 meters, and optionally at least 2 meters. The throw line region may include a throw line at floor level. The throw line region may capture a width of at least 1 m is centred vertically below a line extending perpendicularly from a bull's eye of the dartboard.

The primary camera may have a horizontal angle of view of at least 20°. The primary camera may have a vertical angle of view of at least 40°.

The secondary camera may have an angle of view of at least 25°.

The line extending between a bullseye and the secondary camera may be at an angle greater than 40° with respect to the plane of the play surface of the dartboard.

The line extending between a bullseye and the secondary camera may be at an angle less than 60° with respect to the plane of the play surface of the dartboard, and optionally less than 50° with respect to the plane of the play surface of the dartboard.

Viewed from a second aspect, the present invention provides a dartboard environment comprising: a dartboard; and a camera unit according to the first aspect, the camera unit being mounted adjacent the dartboard.

The dartboard may comprise a bull's eye at substantially a centre of the dartboard. The dartboard may comprise twenty radial sections, which may be arranged rotationally symmetrically around the bull's eye.

The play surface of the dartboard may have a diameter of between 330 mm and 350 mm, and preferably about 340 mm.

The dartboard may have a diameter of between 400 mm and 500 mm, and preferably about 451 mm.

The dartboard may be a non-electronic dartboard. For example, the dartboard may be formed from sisal fibres, cork, coiled paper or other similar materials.

The dartboard may be a regulation dartboard in compliance with the rules of the World Darts Federation. For example, the dartboard may be in compliance with the dartboard specifications at section 4 of the WDF Playing And Tournament Rules—rev 20.

The bull's eye of the dartboard may be at a height of between 1.5 and 2 meters above the floor, preferably between 1.7 and 1.8 meters above the floor, and more preferably at about 1.73 meters above the floor.

The camera unit may be mounted horizontally or vertically adjacent the dartboard. The camera unit may be mounted such that the primary camera is at approximately the same vertical height as the bull's eye of the dartboard, for example, ±50 mm. Alternatively, the camera unit may be mounted such that the primary camera is at approximately the same horizontal alignment as the bull's eye of the dartboard, for example, ±50 mm. In this case, the primary camera may be positioned vertically above the bull's eye, and horizontally aligned with the bull's eye.

The camera unit may be mounted such that the primary camera is in approximately the same plane as the dartboard, for example, ±100 mm. The camera unit may be mounted such that the primary camera is positioned at a horizontal distance of between 400 mm and 700 mm from the bull's eye of the dartboard, and preferably at a horizontal distance of between 500 mm and 600 mm.

Alternatively, the camera unit may be mounted such that the primary is positioned at a distance from the plane of the dartboard, for example, at a distance of between 200 mm and 500 mm from the plane of the dartboard. The camera unit may be mounted such that the primary camera is positioned at a vertical distance of between 400 mm and 700 mm from the bull's eye of the dartboard, and preferably at a vertical distance of between 500 mm and 600 mm.

The dartboard environment may comprise a throw line. The throw line may be at a horizontal distance of between 2.0 meters and 2.7 meters away from the dartboard, preferably between 2.2 meters and 2.5 meters, and more preferably between 2.3 meters and 2.4 meters, and more preferably about 2.37 meters.

The dartboard environment may comprise a raised oche adjacent the throw line.

The throw line may be approximately centred vertically below a line extending perpendicularly from a bull's eye of the dartboard.

The dartboard and the camera unit may be fastened to a wall. The camera unit may be fastened to the wall via the support frame, and particularly via a rail of the support frame. The camera unit may be fastened to the wall by means of a plurality of fasteners, such as screws.

Viewed from a third aspect, the present invention provides a method of recording play of a darts game using a camera unit, the camera unit being mounted adjacent the dartboard and comprising a primary camera and a secondary camera, the method comprising: capturing, using the primary camera, image data including a darts player using the dartboard, wherein the primary camera captures a throw line region including at least 1 meter in width at floor level, the throw line region being located horizontally 2.37 meters away from the dartboard; capturing, using the secondary camera, image data including a play surface of the dartboard, wherein a line extending between a bullseye of the play surface and the secondary camera is at an angle greater than 30° with respect to the plane of the play surface; and wirelessly transmitting, by the camera unit, the image data captured by the primary camera and the secondary camera and/or data derived from the image data, captured by the primary camera and the secondary camera, wherein the primary camera, the secondary camera and a support frame supporting the primary camera and the secondary camera do not obstruct the play surface of the dartboard in a direction perpendicular to a plane of the play surface of the dartboard; and wherein a view of the primary camera of the throw line region is not obstructed by the secondary camera or the support frame.

The camera unit may comprise a camera unit according to the first aspect, and the play of a darts game may take place in a darts environment according to the second aspect.

The method may comprise deriving data from the image data. The data may be derived from one or both of the image data received from the primary camera and the image data derived from the secondary camera. The derivation may comprise use of one or both of machine learning and computer vision.

The data derived from the image data may comprise a determination that a dart has been thrown. The data derived from the image data may comprise a determination that a foul throw has occurred, for example, by a player stepping over a throw line. The data derived from the image data may comprise a score associated with a dart that has struck the dartboard.

BRIEF DESCRIPTION OF DRAWINGS

Certain preferred embodiments of the present invention will now be described in greater detail, by way of example only and with reference to the accompanying drawings, in which.

DETAILED DESCRIPTION

Figure 1:
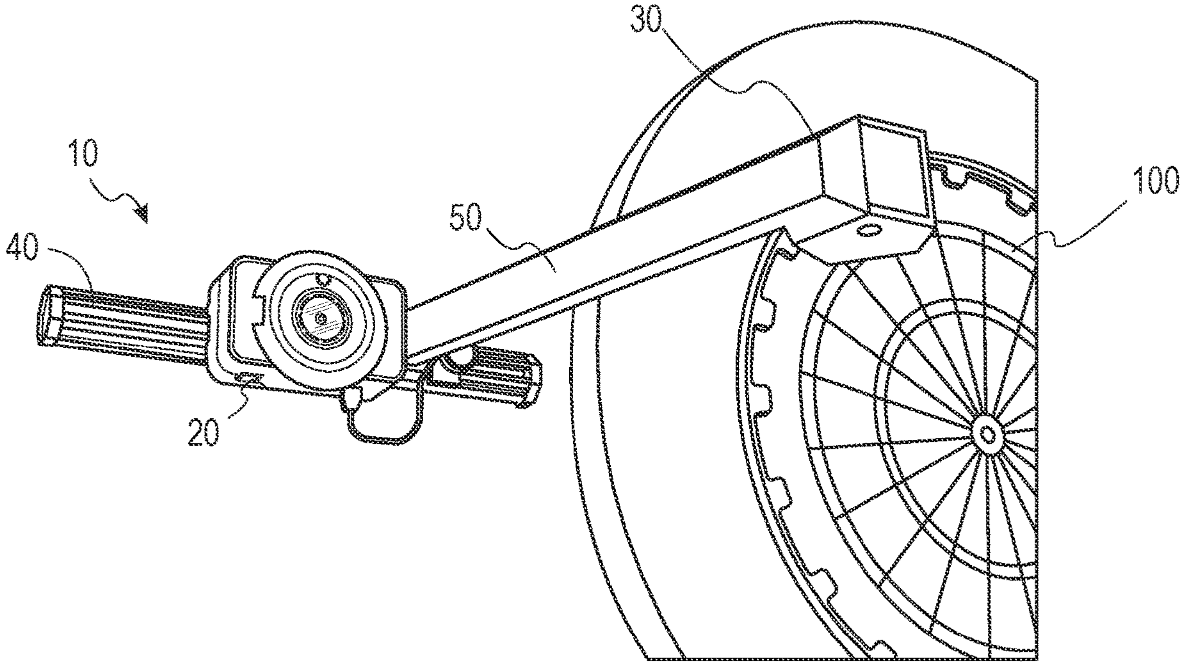
FIG. 1 is a front perspective view of a dartboard camera unit including a primary camera and a secondary camera.
Figure 2:
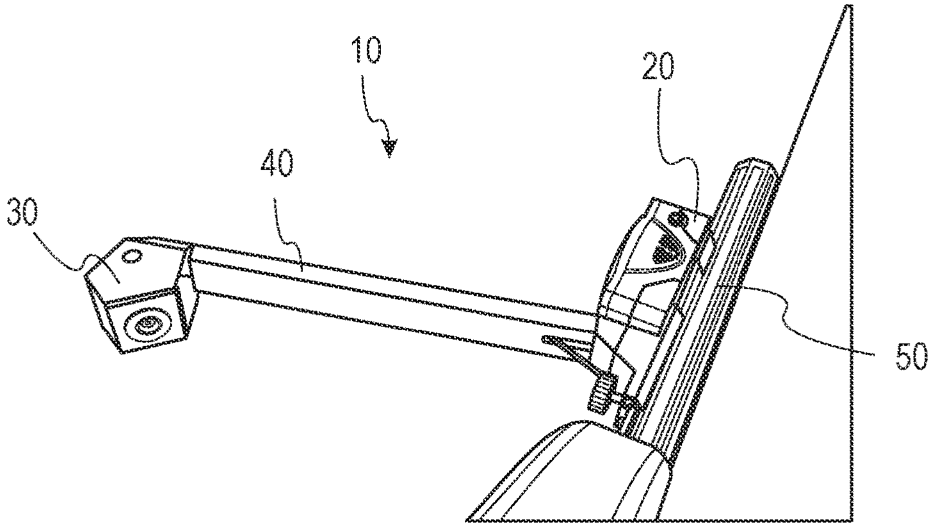
FIG. 2 is a rear perspective view of the dartboard camera unit.

FIGS. 1 and 2 show front and rear perspective views, respectively, of a dartboard camera unit 10 mounted adjacent a dartboard 100.

The dartboard camera unit 10 comprises a primary camera 20 and a secondary camera 30. The primary camera 20 and the secondary camera 30 are supported by a support frame comprising a rail 40 and an arm 50. The rail 40 is attached to a wall adjacent the dartboard 100. The primary camera 20 and the arm 50 are attached to the rail. The arm 50 is in turn attached to the secondary camera 30.

Figure 3:
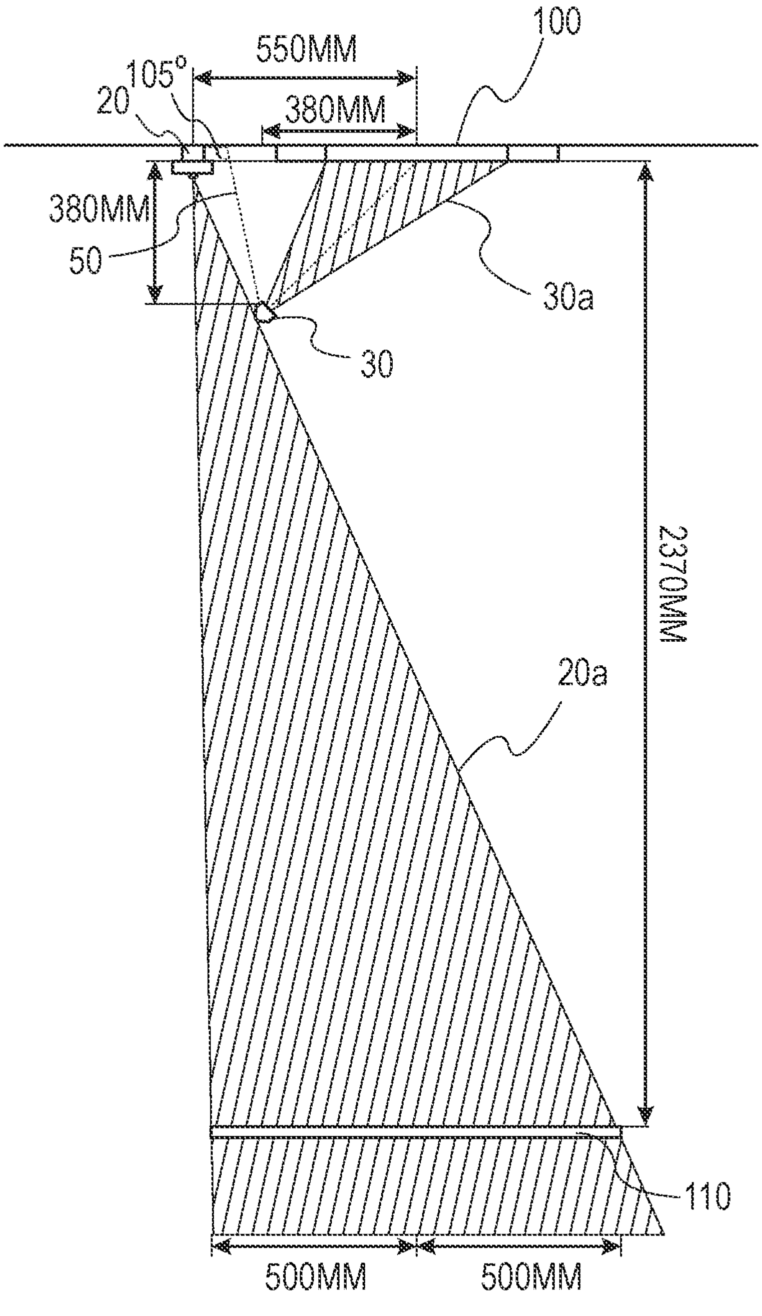
FIG. 3 is a plan view of a darts environment illustrating the fields of view of the primary and secondary cameras, when in use.

FIG. 3 shows a plan view of a darts environment including the dartboard 100 and a throw line 110, which in competitive play would be defined by an edge of an oche (not shown).

The primary camera 20 and the secondary camera 30 of the dartboard camera unit 10 are shown schematically within the darts environment to illustrate their positions, when in use.

When the dartboard camera unit 10 is mounted adjacent the dartboard 100, as shown, the primary camera 20 will capture a darts player standing at the throw line 110 and using the dartboard 100, and the secondary camera will capture a play surface of the dartboard 100.

The primary camera 20 is mounted horizontally adjacent the dartboard 100, such that the primary camera 20 is at approximately the same vertical height as the bull's eye of the dartboard 100 and in approximately the same plane as the dartboard 100. The primary camera 20 is positioned at a distance of 550 mm from the centre of the bull's eye of the dartboard 100.

The primary camera 20 is arranged to capture at least a primary camera field of view 20*a*, which encompasses the throw line 110. As discussed previously, the throw line (for a regulation game) is located on the floor at a horizontal distance of 2.37 m from the face of the dartboard 100.

The primary camera 20 is configured to capture a width of at least 0.5 m on either side of the centre of the throw line 110 (centred vertically below a line extending perpendicularly from the centre of the bull's eye of the dartboard 100. Therefore, the camera requires a horizontal angle of view of at least about 20°.

The primary camera 20 is configured to capture a height of at least 2 m vertically above the floor. Therefore, the primary camera 20 requires a vertical angle of view of at least about 40°.

In practice, the primary camera 20 may have a larger field of view which encompasses the primary camera field of view 20*a*. Thus, an image captured by the primary camera 20 can be cropped to correspond to the primary camera field of view 20*a* illustrated in FIG. 3.

The secondary camera 30 is mounted at approximately the same vertical height as the bull's eye of the dartboard 100, forward of the dartboard 100 and offset to one side. The secondary camera 30 is positioned at a distance of 380 mm to the side of the centre of the bull's eye of the dartboard 100, and 380 mm forward of the face of the dartboard 100. Thus, a line extending from the secondary camera 30 to the bull's eye of the dartboard 100 is at an angle of 45°, relative to the plane of the face of the dartboard 100.

The secondary camera 30 is arranged to capture at least a secondary camera field of view 30*a*, which encompasses at least the play surface of the dartboard 100. The play surface comprises the region of the dartboard 100 within the outer edge of the "double" wire, which in a regulation game has a diameter of 340 mm (±0.5 mm). Therefore, the secondary camera 30 requires an angle of view of at least about 26°.

In practice, the secondary camera 30 may have a larger field of view which encompasses the secondary camera field of view 30*a*. Thus, an image captured by the secondary camera 30 can be cropped to correspond to the secondary camera field of view 30*a* illustrated in FIG. 3.

In the illustrated embodiment, the secondary camera field of view 30*a* encompasses the entire dartboard, i.e., with a diameter of 451 mm. This corresponds to the secondary camera 30 having an angle of view of at least about 35°.

As can be seen from FIG. 3, the above camera positions ensure that the secondary camera 30 does not block the primary camera field of view 20*a*. In particular, whilst the secondary camera 30 may be visible to the primary camera 20, depending on its angle of view, the secondary camera 30 will not block the view of the primary camera 20 of the thrown line 110 or the 2-metre region vertically above the throw line 110.

Furthermore, the camera positions also permit the arm 50 to extend between the primary camera 20 and the secondary camera 30 without blocking either the primary camera field of view 20*a* or the secondary camera field of view 30*a*.

Both the primary camera 20 and the secondary camera 30 are positioned offset from the dartboard 100, such that they do not impede the path of darts thrown from the centre of the throw line 110 towards the dartboard 100.

Figure 4:
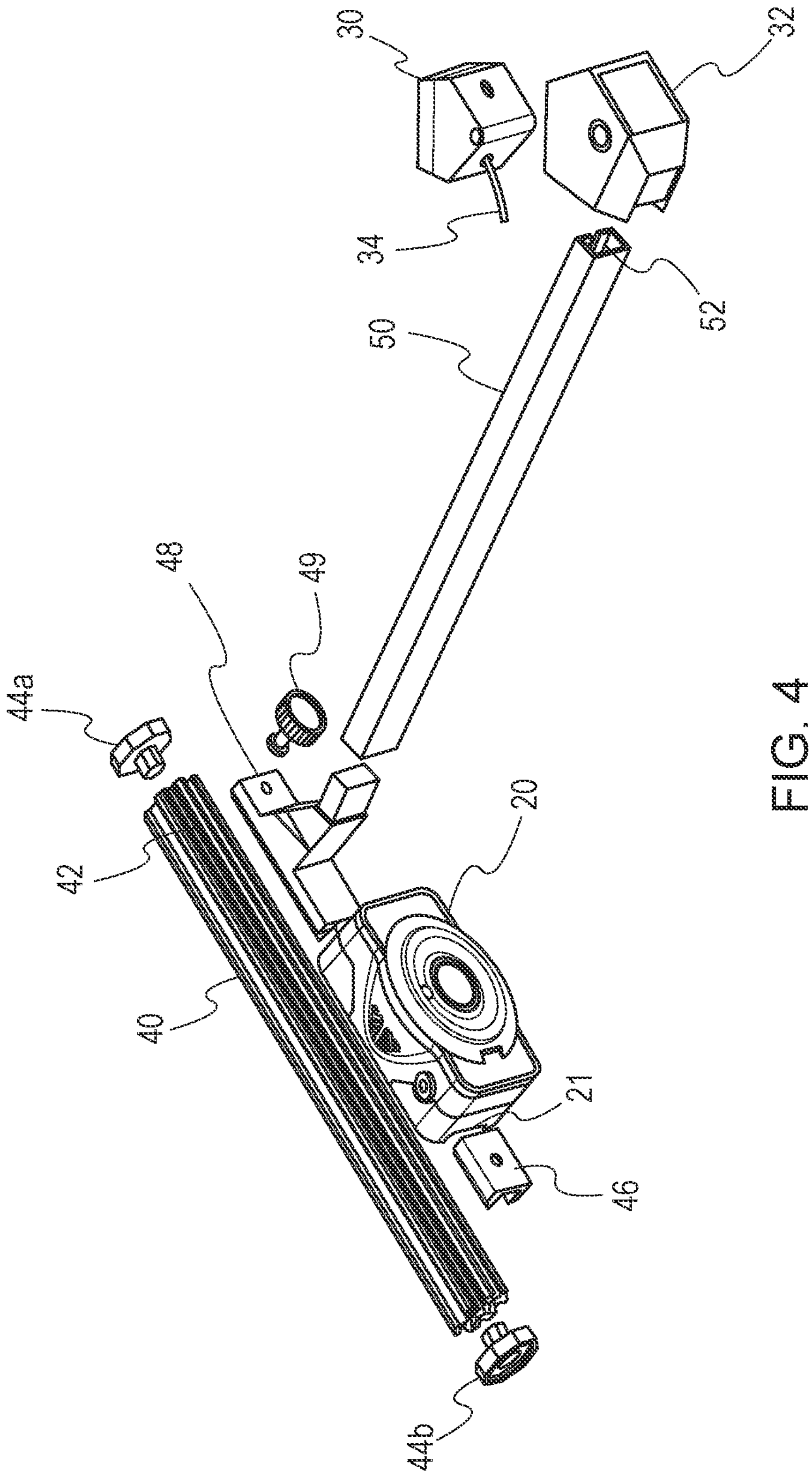
FIG. 4 is an exploded view of the dartboard camera unit.

FIG. 4 shows an exploded view of the dartboard camera unit 10, and further details of the dartboard camera unit 10 will be described with reference to this Figure.

The rail 40 is formed from extruded aluminium, and is configured to be attached to the wall by means of brackets (not shown). However, in alternative embodiments, the rail may be attached to the dartboard 100, or to another component such as a stand or hub. Also, in alternative embodiments, other materials or methods of manufacture may be used for the rail 40.

The rail 40 comprises a track 42, which in the illustrated example is one of four tracks arranged rotationally-symmetrically around the rail 40. The rail 40 further comprises a pair of end caps 44*a*, 44*b* configured to block the ends of each of the tracks.

The primary camera 20 is configured to be mounted to the rail 40. The primary camera 20 comprises a pair of grooves 21 extending along its rear face (only one is visible in FIG. 4), the grooves 21 being open, respectively, at either side of the primary camera 20. In other embodiments, a single groove may be used.

The dartboard camera unit 10 further comprises a camera clip 46 and an arm bracket 48, each of which is configured to engage the grooves 21 of the primary camera unit 20. One or both of the camera clip 46 and the arm bracket 48 may optionally be configured to be releasably fastened to the primary camera 20 using a screw or other fastening means.

The camera clip 46 and the arm bracket 48 are also each configured to engage the track 42 of the rail 40. Thus, the bracket 48 and clip 46 act to secure the primary camera unit 20 to the rail 40. The camera clip 46 and the arm bracket 48 are each formed from moulded plastic material, although other materials or methods of manufacture may be used.

The arm bracket 48 is further configured to engage the arm 50, thereby mounting the arm 50 to the rail 40. The arm 50 is formed from aluminium so as to provide sufficient strength to support the secondary camera 30 at a low weight. The arm 50 is formed as a rectangular box-section, although other shapes may be used.

The bracket 48 comprises a locking mechanism 49 in the form of a thumb screw to restrict axial movement of the arm bracket 48 along the track 42 of the rail 40, thereby allowing the axial positions of the primary camera 20 and secondary camera 30 to be locked in place, ones the desired position is achieved. This simplifies mounting of the rail 40 because only the vertical position of the rail needs to be precisely measured when mounting it to the wall.

The arm bracket 48 is configured to engage the rail 40 in two opposite orientations (i.e., rotated 180° about an axis extending perpendicularly away from the wall). In each orientation, the bracket is configured to engage one of the grooves 21 of the primary camera 10. The clip 46 is likewise configured to engage either of the grooves 21 of the primary camera 10. Thus, the two orientations of the arm bracket 48 permit the secondary camera 30 to be mounted either to the left or to the right of the primary camera 20, and so the dartboard camera unit 10 can be mounted on either side of the dartboard 100.

The end of the arm 50 opposite the arm bracket 48 is configured to engage a secondary camera bracket 32, which in turn supports the secondary camera 30. The secondary camera 30 is pivotally mounted to the secondary camera bracket 32, so as to permit limited movement of the secondary camera 30. This allows the angle of the secondary camera 30 to be fine-tuned, so as to centre its view on the dartboard 100.

The secondary camera bracket 32 is formed from moulded plastic, although other materials or methods of manufacture may be used. The secondary camera bracket 32 forms a housing that protects the secondary camera 30 from impacts by stray darts.

Figure 5:
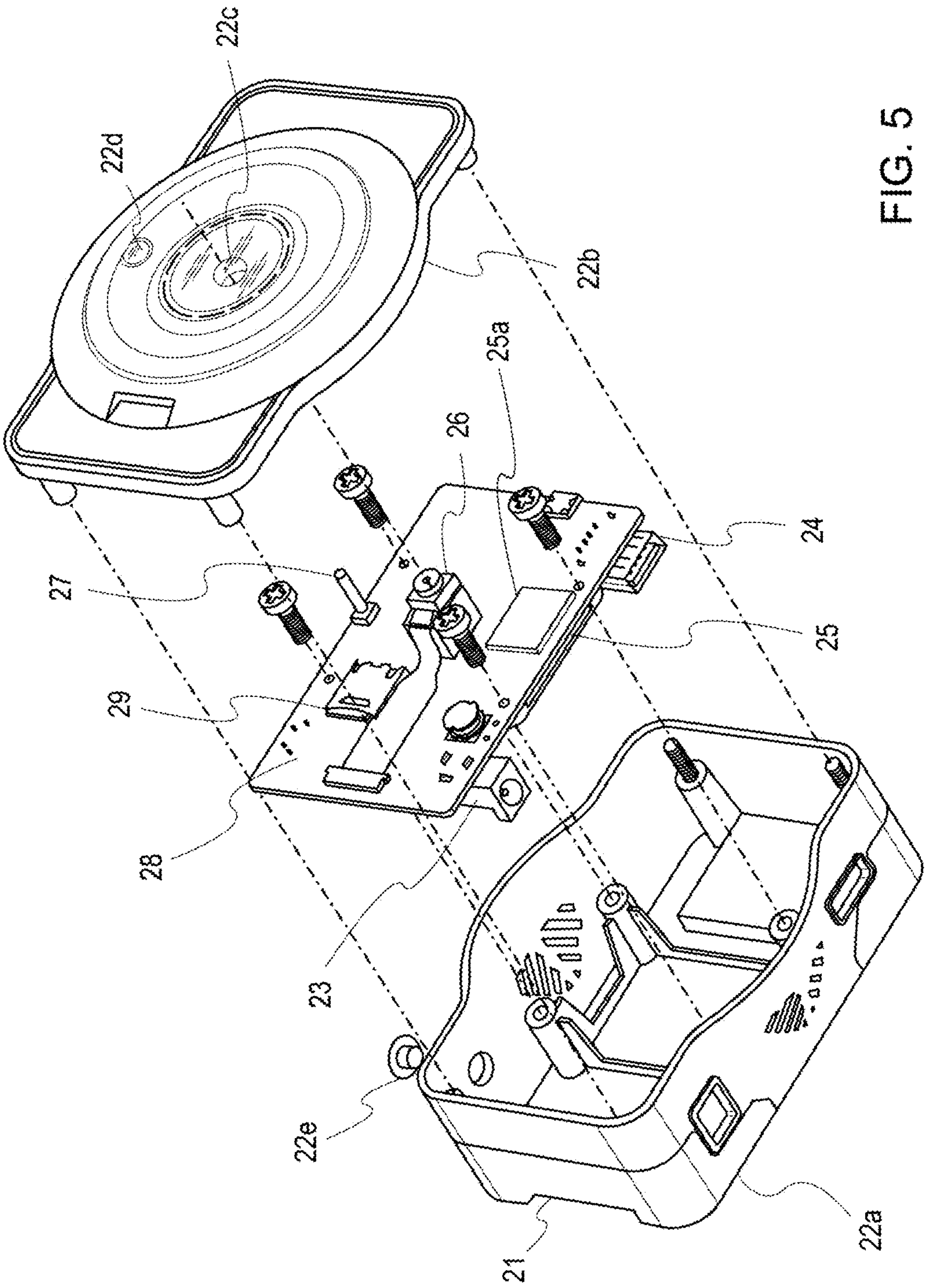
FIG. 5 is an exploded view of the primary camera.

FIG. 5 shows an exploded view of the primary camera 20 of the dartboard camera unit 10, and further details of the primary camera 20 will be described with reference to this Figure.

The primary camera 20 comprises a housing 22, composes of a housing body 22*a* and a housing lid 22*b*. Both parts are formed from moulded plastic material, although other materials or methods of manufacture may be used. The housing body 22*a* and the housing lid 22*b* are arranged to fasten together to form an internal chamber. In the illustrated embodiment, the housing body 22*a* and the housing lid 22*b* are fastened together by screws, which are inserted from a rear side of the housing body 22*a*.

The housing 22 further comprises a primary camera lens 22*c*, an LED cover 22*d*, and a control button 22*e*.

The primary camera 20 comprises two ports 23, 24 exposed from the housing 22.

The first port 23 is a power supply port 23. The power supply port 23 is configured to receive power from a mains outlet. For example, the power supply port 23 may be configured to receive DC power from an electrical transformer connected to a mains power outlet.

In some embodiments, the primary camera 20 could include a battery, which might be recharged via the power supply port 23 or the power supply port 23 could be omitted.

The second port 24 is a secondary camera connection port 24. A cable 34 (FIG. 4) extends from the secondary camera 30 and, in use, is connected to the secondary camera connection port 24. The cable 34 permits transmission of power from the primary camera 20 to the secondary camera 30. The cable 34 also permits transmission of data between the secondary camera 30 to the primary camera 20. The secondary camera connection port 24 in this embodiment is a USB port.

The primary camera 20 is further provided with a unit controller 25 having an associated wireless interface module 25*a* permitting wireless communication, such as WiFi or Bluetooth communication. The unit controller 25 comprises a processing chip mounted to a circuit board. In the illustrated embodiment, the first and second ports 23, 24 are mounted on the circuit board so as to be exposed from the housing 22.

The primary camera 20 also comprises a camera element 26 and an indicator 27 in the form of an LED 27. Both are mounted to the circuit board, and communicate with the unit controller 25. The camera element 26 is configured to align with the primary camera lens 22*c* of the camera, and the indicator is configured to align with the indicator cover 22*d*.

A tactile switch 28 is also mounted to the circuit board, and communicates with the unit controller 25. The switch 28 is configured to align with the control button 22*e* of the housing 22, such that actuation of the control button 22*e* causes actuation of the switch 28.

The primary camera 20 also comprises a data interface 29 in the form of an SD card slot 29. The data interface 29 is mounted to the circuit board, and communicates with the unit controller 25. The data interface permits updating of the software of the unit controller 25 of the primary camera 20.

Installation and operation of the dartboard camera unit 10 will now be described.

To install the dartboard camera unit 10, the rail 40 is first mounted adjacent the dartboard 100. Optimally, the rail 40 is mounted to the wall by wall-mount brackets. The rail 40 is mounted so as to extend substantially horizontally, and at approximately the same height as the bullseye of the dartboard 100.

Next, the camera clip 46 and bracket 48 are connected to the track 42 of the rail 40. Sufficient space is left between the camera clip 46 and bracket 48 to receive the primary camera 20. The camera clip 46 and bracket 48 are oriented with the bracket 48 closer to the dartboard 100, such that the arm 50 will extend towards the dartboard 100, and will not obscure the view of primary camera 20.

The primary camera 20 is then held against the rail 40 and between the camera clip 46 and bracket 48. The camera clip 46 and bracket 48 are pushed together so as to be respectively received within the groove 21 of the primary camera 20, and thereby retain the primary camera 20 against the rail 40.

Alternatively, the camera clip 46 and bracket 48 may be secured to the primary camera 20 and connected to the track 42 of the rail 40.

Optionally, the camera clip 46 and bracket 48 may be releasably retained within the groove 21, for example, by friction fit or by a clip or the like. Thus, the primary camera 20, the camera clip 46 and bracket 48 may be slid along the track 42 of the rail 40 to position them at the desired location. Once in the desired location, the locking mechanism 49 may be actuated to prevent further motion.

The arm 50 is then engaged with the bracket 48, and the secondary camera bracket 32 is engaged with the arm 50. The secondary camera 30 may be pre-installed within the secondary camera bracket 32, or may be separately installed therein.

As discussed above, the secondary camera 30 is pivotable within the secondary camera bracket 32, and may be pivoted to capture the full play surface of the dartboard 100.

The secondary camera 30 comprises a cable 34, which is connected to the secondary camera connection port 24 of the primary camera 20. Optionally, the cable 34 may be run within a channel 52 formed in the arm 50.

Once installed and a power cable is connected to the power supply port 23, the control button 22*e* of the primary camera 20 may be actuated to enable the dartboard camera unit 10.

The order of the above steps is merely one example, and these steps may be performed in a different order to achieve the same effect.

During operation, the unit controller 25 will connect to an internet-enabled device, such as a router, a computer or a mobile phone, using wireless communication, such as WiFi or Bluetooth communication, through the wireless interface module 25*a*. However, alternatively, the unit controller 25 may use a wired connection to communicate with the internet-enabled device.

In one example, the unit controller 25 will initially connect to a mobile phone or the like via Bluetooth in order to allow a user to interface with the unit controller 25. The user can then supply Wi-Fi credentials to allow the unit controller 25 to connect to a Wi-Fi network, via which the unit controller 25 can connect to the internet.

The unit controller 25 will receive video data captured via each of the primary camera 20 and the secondary camera 30. In various embodiments, the unit controller 25 may transmit the video data directly to a remote server via the internet.

Optionally, the data may be processed prior to transmission to produce derivative data. In one example, machine learning and/or computer vision may be applied to the video data captured via one or both of the primary camera 20 and the secondary camera 30. In one example, the image data from the primary camera 20 and the secondary camera 30 may be used to determine when a dart has been thrown. In another example, the image data from the primary camera 20 may be used to determine whether a foul throw has occurred, for example, by a player stepping over the throw line 110. In a further example, the image data from the secondary camera 30 may be processed to determine a score associated with a dart that has struck the dartboard 100.

Where derivative data is obtained, this may be sent in addition to or instead of the image data.

Figure 6:
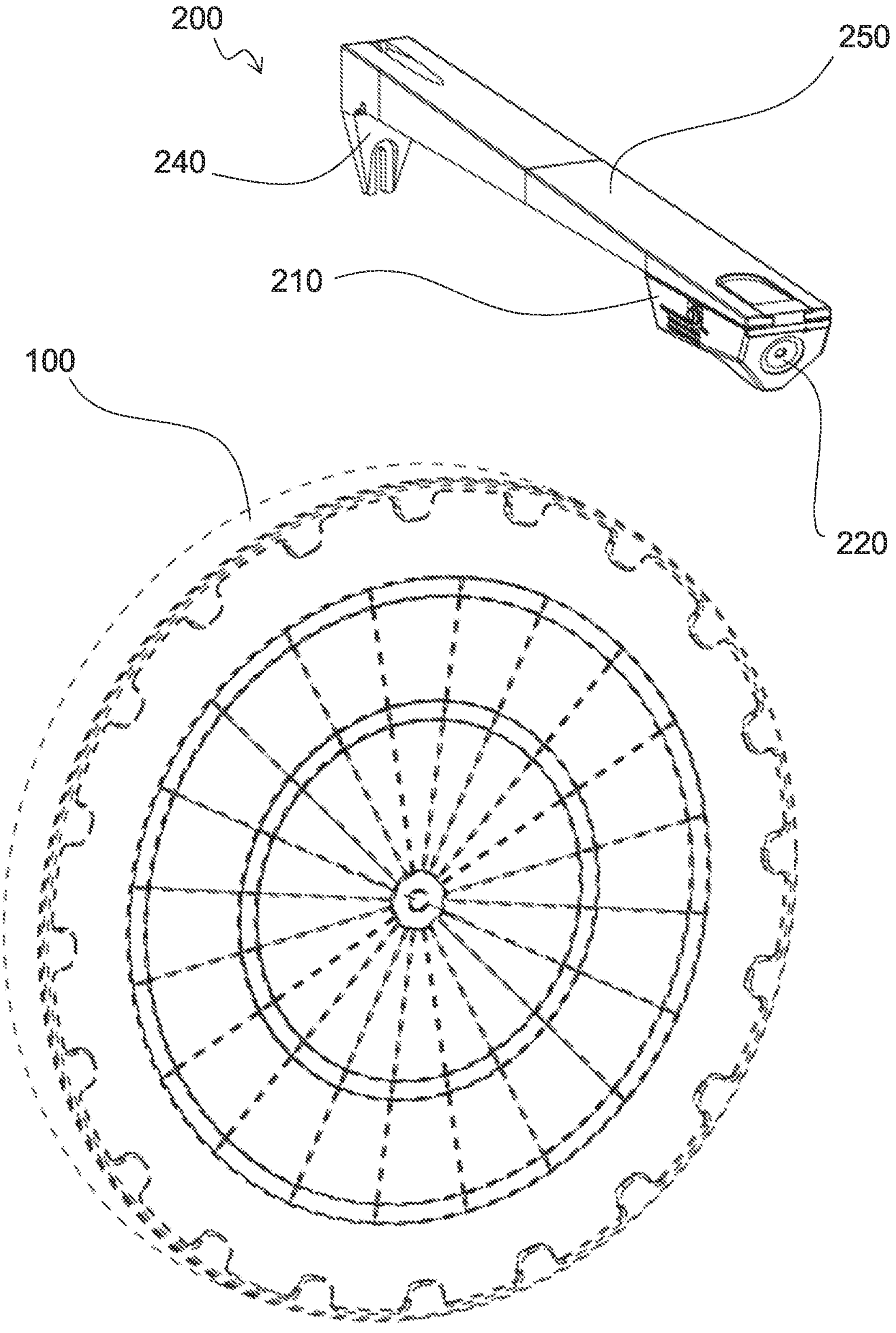
FIG. 6 is a perspective view of an alternative embodiment of the dartboard camera unit including a single camera module.

FIG. 6 shows a perspective view of an alternative embodiment of the dartboard camera unit 200, which performs the same function as the camera unit 10 shown in FIGS. 1 to 5, but in which the primary camera 220 and the secondary camera 230 (not visible in FIG. 6) are part of a singular camera module 210.

The support frame in this embodiment comprises an arm 250, and the camera module 210 is attached to a proximal end of the arm 250, such that it extends downwardly from a lower face of the arm 250. In this way, it is ensured that the arm 250 does not obstruct the view of either the primary camera 220 or the secondary camera 230.

The arm 250 is configured to be slidably mounted to the rail 40 at its distal end 240. The arm 250 may be mounted to the rail (not shown) through a bracket or other suitable attachment means. The arm 250 is slidably moveable relative to the dartboard 100 via the rail. The primary and secondary cameras 220, 230 are therefore also slidably movable relative to the dartboard 100, and move in unison. In this example, the rail may be mounted vertically on the wall, and the arm 250 may be configured to slide vertically upwards or downwards. Alternatively, the arm 250 may be attached directly to the wall without the use of a rail.

Figure 7:
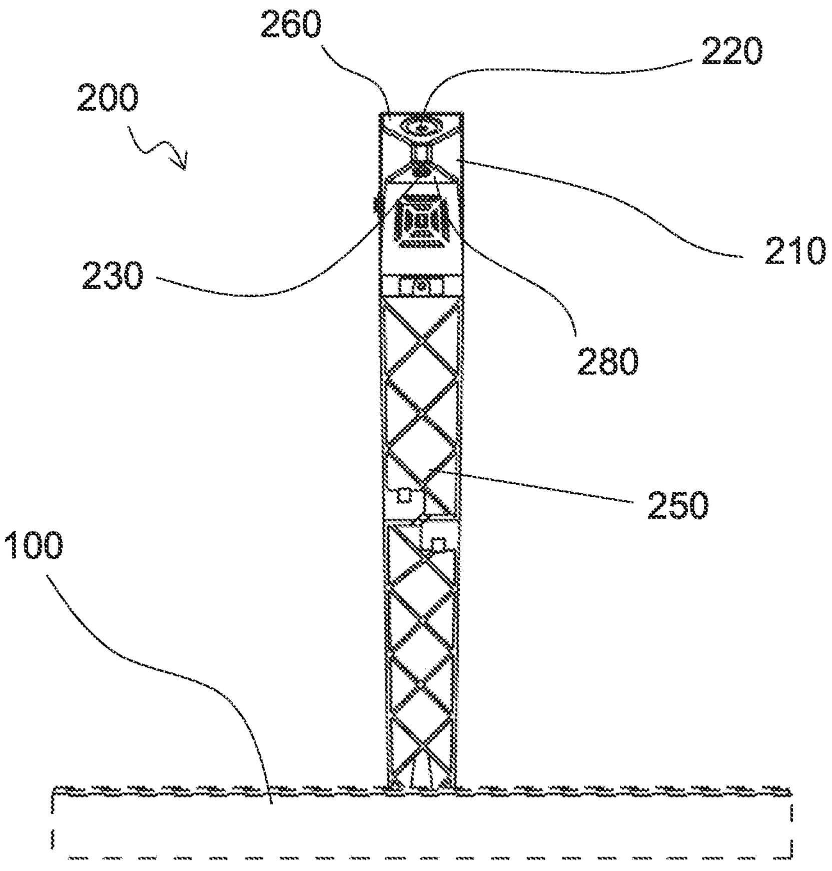
FIG. 7 is a bottom view of the dartboard camera unit of FIG. 6.

As can be seen from FIG. 7, the camera module 250 comprises a proximal face 260 and a distal face 280. The primary camera 220 is located at the proximal face 260 such that it faces generally in the direction of the darts player during play, whilst the secondary camera 230 is located at the distal face 280 such that it faces generally in the direction of the dartboard during play. Due to the positioning of the secondary camera 230 in the camera module 210 directly behind the primary camera 220, the secondary camera 230 is protected from incoming darts by the housing of the camera module 210. Furthermore, as the secondary camera 230 is behind the primary camera 220, the primary camera 210 does not obstruct the view of the secondary camera 220, or vice versa. The secondary camera 230 may be rotatably mounted within the camera module 210.

The distal and proximal faces 260, 280 of the camera module 210 are angled relative to a vertical plane, thereby causing the primary and secondary cameras 220, 230 to also be angled relative to the vertical plane. The primary and secondary cameras 220, 230 are each angled downwardly. This allows the cameras 220, 230 to capture a better image of the dartboard or dartboard player when the camera unit 200 is mounted to the wall at a position vertically above the dartboard 100.

In use, the camera unit 200 is mounted such that the primary camera 220 is aligned vertically above the bull's eye of the dartboard 100, as can be seen from FIG. 6. That is, the primary camera 220 is located above the bull's eye vertically when looking at the dartboard 100.

As for the camera unit 10 shown in FIGS. 1 to 5, the primary camera 220 is arranged to capture at least the primary camera field of view 20*a*, and the secondary camera 230 is arranged to capture at least the secondary camera field of view 30*a*.

In the example of FIGS. 6 and 7, a cable (not shown) may supply power to the secondary camera 230, and may run through a hollow interior of the arm 250 from a power supply to the secondary camera 230. The cable 34 may also be connected to the primary camera 220, such that the primary camera 220 also receives power through the cable 34. Alternatively, the primary camera 220 may be connected to the secondary camera 230 and receive power through the secondary camera 230.

It will be appreciated that the camera unit 200 of FIGS. 6 and 7 operates in substantially the same manner as the camera unit 10 of FIGS. 1 to 5, particularly with respect to the operation of the unit controller 25 and the cameras 220, 230.

The invention claimed is:

1. A dartboard assembly comprising:

a wall;

a dartboard fastened to the wall; and a camera unit mounted adjacent the dartboard and fastened to the wall, the camera unit being configured to be mounted or unmounted as a singular unit and comprising:

a primary camera and a secondary camera;

a support frame supporting the primary and secondary camera relative to one another such that the primary camera will capture a darts player using the dartboard and the secondary camera will capture a play surface of the dartboard, wherein the support frame comprises a single arm extending substantially horizontally with respect to the wall, the primary camera and the secondary camera each being attached to a proximal end of the arm; and a wireless interface module arranged to wirelessly transmit image data captured by the primary camera and the secondary camera, and/or data derived from the image data captured by the primary camera and the secondary camera, wherein the camera unit is mounted adjacent the dartboard such that:

the primary camera is positioned a radial distance of less than 700 mm from a bullseye of the play surface of the dartboard;

the primary camera, the secondary camera and the support frame do not obstruct the play surface of the dartboard in a direction perpendicular to a plane of the play surface of the dartboard;

a line extending between the bullseye of the play surface and the secondary camera is at an angle greater than 30° with respect to the plane of the play surface of the dartboard;

the primary camera captures a throw line region including at least 1 meter in width at floor level, the throw line region being located horizontally 2.37 meters away from the dartboard, and the view of the primary camera of the throw line region is not obstructed by the secondary camera or the support frame.

2. The dartboard assembly according to claim 1, wherein the support frame comprises a rail including a track, and wherein the primary camera is configured to slidably engage the track.

3. The dartboard assembly according to claim 2, wherein the arm is configured to slidably engage the rail.

4. The dartboard assembly according to according to claim 3, wherein the support frame comprises a fastener configured to selectively prevent sliding of the primary camera and/or the secondary camera with respect to the rail, and wherein the fastener is configured to be actuated by hand.

5. The dartboard assembly according to claim 1, wherein the support frame comprises a secondary camera bracket configured to protect the secondary camera from impact by darts thrown from a throw line.

6. The dartboard assembly according to claim 5, wherein the secondary camera is rotatably mounted within the secondary camera bracket.

7. The dartboard assembly according to claim 1, wherein the primary camera is configured to receive power from a mains power supply, and wherein the secondary camera is configured to receive power via the primary camera unit.

8. The dartboard assembly according to claim 1, wherein the camera unit comprises a unit controller configured to derive the data derived from the image data, and wherein the data derived from the image data comprises a determination that a dart has been thrown.

9. The dartboard assembly according to claim 1, wherein the camera unit comprises a unit controller configured to derive the data derived from the image data, and wherein the data derived from the image data comprises a determination that a foul throw has occurred.

10. The dartboard assembly according to claim 1, wherein the camera unit comprises a unit controller configured to derive the data derived from the image data, and wherein the data derived from the image data comprises a score associated with a dart that has struck the dartboard.

11. The dartboard assembly according to claim 1, wherein the camera unit is mounted horizontally adjacent the dartboard.

12. The dartboard assembly according to claim 1, wherein the throw line region comprises a throw line at a horizontal distance of between 2.0 meters and 2.7 meters away from the dartboard, and the primary camera captures the throw line.

13. A method of recording play of a darts game using a camera unit, the camera unit being mounted to a wall as a singular unit adjacent a dartboard fastened to the wall, the camera unit comprising a primary camera, a secondary camera, and a support frame including a support arm extending substantially horizontally with respect to the wall, the primary camera and the secondary camera being attached to a proximal end of the support arm, the method comprising:

capturing, using the primary camera, image data including a darts player using the dartboard, wherein the primary camera is positioned a radial distance of less than 700 mm from a bullseye of a play surface of the dartboard and captures a throw line region including at least 1 meter in width at floor level, the throw line region being located horizontally 2.37 meters away from the dartboard;

capturing, using the secondary camera, image data including the play surface of the dartboard, wherein a line extending between the bullseye of the play surface and the secondary camera is at an angle greater than 30° with respect to the plane of the play surface; and wirelessly transmitting, by the camera unit, the image data captured by the primary camera and the secondary camera and/or data derived from the image data, captured by the primary camera and the secondary camera, wherein the primary camera, the secondary camera and the support frame supporting the primary camera and the secondary camera do not obstruct the play surface of the dartboard in a direction perpendicular to a plane of the play surface of the dartboard; and wherein a view of the primary camera of the throw line region is not obstructed by the secondary camera or the support frame.

14. The method according to claim 13, further comprising:

deriving the derived data from one or both of the image data received from the primary camera and the image data derived from the secondary camera using one or both of machine learning and computer vision.

15. The method according to claim 14, wherein the data derived from the image data may comprise one or more of:

a determination that a dart has been thrown;

a determination that a foul throw has occurred; and a score associated with a dart that has struck the dartboard.

16. A camera unit according to claim 1, wherein the secondary camera is positioned directly behind the primary camera, in a direction perpendicular to the plane of the play surface of the dartboard.

17. A dartboard assembly comprising:

a wall;

a dartboard fastened to the wall; and a camera unit mounted adjacent the dartboard and fastened to the wall, the camera unit being configured to be mounted or unmounted as a singular unit and comprising:

a primary camera and a secondary camera;

a support frame supporting the primary and secondary camera relative to one another such that the primary camera will capture a darts player using the dartboard and the secondary camera will capture a play surface of the dartboard, wherein the support frame comprises a single arm extending outwardly with respect to the wall, the primary camera and the secondary camera each being attached to the arm to be positioned forward of and offset relative to the dartboard; and a wireless interface module arranged to wirelessly transmit image data captured by the primary camera and the secondary camera, and/or data derived from the image data captured by the primary camera and the secondary camera, wherein the camera unit is mounted adjacent the dartboard such that:

the primary camera is positioned a radial distance of less than 700 mm from a bullseye of the play surface of the dartboard;

the primary camera, the secondary camera and the support frame do not obstruct the play surface of the dartboard in a direction perpendicular to a plane of the play surface of the dartboard;

a line extending between the bullseye of the play surface and the secondary camera is at an angle greater than 30° with respect to the plane of the play surface of the dartboard;

the primary camera captures a throw line region including at least 1 meter in width at floor level, the throw line region being located horizontally 2.37 meters away from the dartboard, and the view of the primary camera of the throw line region is not obstructed by the secondary camera or the support frame.

18. The dartboard assembly according to claim 17, wherein the support frame is mounted to the wall at a position vertically above the dartboard.

19. The dartboard assembly according to claim 17, wherein the camera unit comprises a unit controller configured to derive the data derived from the image data, and wherein the data derived from the image data comprises one or more of the following: a determination that a dart has been thrown, a determination that a foul throw has occurred, or a score associated with a dart that has struck the dartboard.

* * * * *